United States Patent
Archer et al.

[15] 3,692,790
[45] Sept. 19, 1972

[54] 5-(AMINOALKYLAMINO)-6(OR)-HALO-8-QUINOLINEMETHANOLS, THEIR ALKYL ETHERS AND ALKANOYL ESTERS

[72] Inventors: Sydney Archer, Bethlehem; Denis M. Bailey, East Greenbush, both of N.Y.

[73] Assignee: Sterling Drug, Inc., New York, N.Y.

[22] Filed: Dec. 5, 1969

[21] Appl. No.: 882,723

Related U.S. Application Data

[63] Continuation-in-part of Ser. No. 690,795, Dec. 15, 1967, abandoned.

[30] Foreign Application Priority Data

Dec. 9, 1968 Great Britain..........58,462/68

[52] U.S. Cl...260/287 R, 260/247.5 B, 260/268 BG, 260/283 R, 260/286 R, 260/288 A, 260/289 R, 424/248, 424/250, 424/258
[51] Int. Cl. .............................................C07d 33/54
[58] Field of Search ......................260/288 A, 287 R

[56] References Cited

UNITED STATES PATENTS

| 3,391,146 | 7/1968 | Godfrey | 260/287 |
| 3,558,627 | 1/1971 | Archer | 260/268 PH |
| 3,622,457 | 11/1971 | Dennis | 260/268 BQ |

*Primary Examiner*—Donald G. Daus
*Attorney*—Elmer J. Lawson, B. Woodrow Wyatt, Thomas L. Johnson, Robert K. Bair, William G. Webb and Roger T. Wolfe

[57] ABSTRACT

5-(Aminoalkylamino)-6(or 7)-halo-8-quinolinemethanols, their lower-alkyl ethers and lower-alkanoyl esters, having schistosomacidal activity, are prepared by reducing the corresponding lower-alkyl 5-(aminoalkylamino)-6(or 7)-halo-8-quinolinecarboxylates to prepare said 8-quinolinemethanols, and then reacting the latter with a lower-alkanol in the presence of an acid to obtain the lower-alkyl ethers and reacting the 8-quinolinemethanols with a lower-alkanoylating agent, e.g., acid chloride or anhydride, to form their lower-alkanoate esters.

5 Claims, No Drawings

5-(AMINOALKYLAMINO)-6(OR 7)-HALO-8-QUINOLINEMETHANOLS, THEIR ALKYL ETHERS AND ALKANOYL ESTERS

This application is a continuation-in-part of our copending application Ser. No. 690,795, filed Dec. 15, 1967 and now abandoned.

This invention relates to compositions of matter of the class of substituted quinolines and to their preparation. schistosomacidal The invention sought to be patented, in one composition aspect, resides in the class of compounds which we designate as 6(or 7)-halo-5-($R_1R_2$N—Y—NH)-8-quinoline methanols, their lower-alkyl ethers and their lower-alkanoyl esters, where Y is polycarbon-lower-alkylene, $R_1$ is hydrogen, lower-alkyl or lower-2-hydroxyalkyl, $R_2$ is lower-alkyl or lower-2-hydroxyalkyl, and where $R_1$ and $R_2$ taken with N comprehends saturated N-heteromonocyclic radicals having five to seven ring atoms. Accordingly, we depict these compounds as having halo attached to the 6- or 7-position and having aminoalkylamino of the formula $R_1R_2$N—Y—NH attached to the 5-position of 8-quinolinemethanols and lower-alkyl ethers and lower-alkanoyl esters thereof. The embodiments of this composition aspect of the invention, when tested according to standard chemotherapeutic evaluation procedures have the inherent applied use characteristics of having schistosomacidal activity. The compounds are useful as schistomacidal agents for treatment of mammalian subjects.

The invention sought to be patented, in another composition aspect, resides in the class of compounds which we designate as lower-alkyl 6(or 7)-halo-5-($R_1R_2$N—Y—NH)-8-quinolinecarboxylates where $R_1$, $R_2$ and Y are defined as hereinabove described. Accordingly, we depict these compounds as having halo attached to the 6- or 7-position and having aminoalkylamino of the formula $R_1R_2$N—Y—NH attached to the 5-position of lower-alkyl 8-quinolinecarboxylates. The embodiments of this composition aspect of the invention are useful as intermediates in the preparation of the above-described 6(or 7)-halo-5-($R_1R_2$N—Y—NH)-8-quinolinemethanols, and ether and ester derivatives.

The invention sought to be patented, in one process aspect, resides in the process of preparing said 6(or 7)-halo-5-($R_1R_2$N—Y—NH)-8-quinolinemethanols which comprises reacting the corresponding lower-alkyl 6(or 7)-halo-5-($R_1R_2$N—Y—NH)-8-quinolinecarboxylate with a reducing agent effective to reduce carboxylic acid esters to alcohols.

Without limiting the generality of the foregoing, illustrative and preferred embodiments of our 6(or 7)-halo-5-($R_1R_2$N—Y—NH)-8-quinolinemethanols, ethers and esters are those of Formula I:

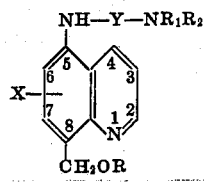

where X is halo, R is hydrogen, lower-alkyl or lower-alkanoyl, Y is polycarbon-lower-alkylene having from two to four carbon atoms and having its two connecting linkages on different carbon atoms, $R_1$ is hydrogen, lower-alkyl or lower-2-hydroxyalkyl and $R_2$ is lower-alkyl or lower-2-hydroxyalkyl, and where $R_1$ and $R_2$ taken with N, i.e., $NR_1R_2$, also comprehends saturated N-heteromonocyclic radicals having five to seven ring atoms, illustrated by piperidino, pyrrolidino, morpholino, piperazino, hexamethyleneimino and lower-alkylated derivatives thereof. Illustrative and preferred embodiments of our intermediate lower-alkyl 6(or 7)-halo-5-($R_1R_2$N—Y—NH)-8-quinolinecarboxylates are those of Formula II:

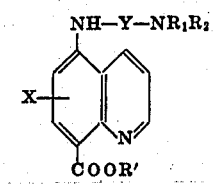

where X, Y, $R_1$ and $R_2$ are defined as above in Formula I, and R is lower-alkyl.

The term "lower-alkyl," as used herein, e.g., as one of the meanings for R, $R_1$ or $R_2$ in Formula I or for R' in Formula II, means alkyl radicals having from one to six carbon atoms, illustrated by methyl, ethyl, n-propyl, isopropyl, n-butyl, 2-butyl, isobutyl, n-amyl, n-hexyl, and the like.

The term "halo," as used herein, e.g., as one of the meanings for X in Formulas I or II, means chloro, bromo, iodo or fluoro, with chloro being preferred because of the ready availability and cost advantages of chloro intermediates.

The term "lower-2-hydroxyalkyl," as used herein, e.g., as meanings for $R_1$ and $R_2$ in Formulas I or II, means hydroxyalkyl radicals having from two to six carbon atoms and having the hydroxy group attached to the carbon atom that is one carbon atom removed from the side chain nitrogen atom, illustrated by 2-hydroxyethyl, 2-hydroxypropyl, 2-hydroxy-2-methylpropyl, 2-hydroxybutyl, 2-hydroxy-2-methylbutyl, 2-hydroxy-2-ethylpropyl, 2-hydroxyhexyl and the like.

The term "polycarbon-lower-alkylene," as used herein, e.g., as represented by Y is Formulas I and II, means alkylene radicals having from two to four carbon atoms and having its connecting linkages on different carbon atoms, illustrated by

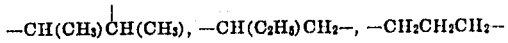

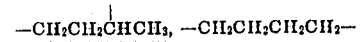

and the like.

When $NR_1R_2$ of Formula I comprehends (lower-alkylated)-N-heteromonocyclic radicals, lower-alkyl radicals can be attached to any available ring-atom and can vary preferably from one to three in number, e.g., 2-methylpiperidino, 3-ethylpiperidino, 4-methylpiperidino, 2,6-dimethylpiperidino, 2,4-dimethylpiperidino, 2,4,6-trimethylpiperidino, 3n-propylpiperidino, 2,2-dimethylpiperidino, 2-methylpyrrolidino, 2,5-dimethylpyrrolidino, 2,3-dimethylmorpholino, 2-ethyl-morpholino, 2-methylhexamethyleneimino, 2,7-dimethylhexamethyl-eneimino, 4-methylpiperazino, 3-ethylpiperazino, 2,4,6-trimethylpiperazino, and the like.

The term "lower-alkanoyl," as used herein, i.e., for one of the meanings of R in Formula I, are alkanoyl radicals having from one to six carbon atoms which can be arranged as straight or branched chains, e.g., formyl, acetyl, propionyl, (n-propanoyl), isobutyryl (2-methyl-n-propanoyl), and caproyl (n-hexanoyl).

The 6(or 7)-halo-5-($R_1R_2N-Y-NH$)-8-quinolinemethanols, ethers and esters of our invention are useful in the free base form or in the form of their acid-addition salts. The acid-addition salts are simply a more convenient form for use; and, in practice, use of the salt form inherently amounts to use of the base form. The acids which can be used to prepare the acid-addition salts are preferably those which produce, when combined with the free base, chemotherapeutically acceptable salts, that is, salts whose anions are relatively innocous to the animal organism in chemotherapeutic doses of the salts, so that the beneficial properties inherent in the free base are not vitiated by side effects ascribable to the anions; in other words, the latter do not substantially affect the chemotherapeutic properties inherent in the cations. Appropriate chemotherapeutically acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, 3-hydroxy-2naphthoic acid, pamoic acid (2,2'-dihydroxy-1,1'-dinaphthylmethane-3,3'-dicarboxylic acid), naponic acid (1,4-naphthalenedisulfonic acid), and the like, giving the hydrochloride, hydrobromide, hydriodide, nitrate, phosphate, sulfamate, sulfate, acetate, citrate, tartrate, lactate, methanesulfonate, ethanesulfonate, benzenesulfonate, p-toluenesulfonate, quinate, 3-hydroxy-2-naphthoate, pamoate and naponate, respectively.

The acid-addition salts are prepared preferably by reacting the free base and acid in an organic solvent, e.g., ethanol, acetone, etc., in which case the salt separates directly or can be obtained by concentration of the solution.

Although chemotherapeutically acceptable salts are preferred, all acid-addition salts are within the scope of our invention. All acid-addition salts are useful as sources of the free base form even if the particular salt per se is not desired as the final product, as for example when the salt is formed for purposes of purification or identification, or when it is used as an intermediate in preparing a chemotherapeutically acceptable salt by ion exchange procedures.

The molecular structures of the 6(or 7)-halo-5-($R_1R_2N-Y-NH$)-8-quinolinemethanols, ethers and esters of our invention are assigned on the basis of evidence provided by infrared (IR), ultraviolet (UV) and nuclear magnetic resonance (NMR) spectra, by chromatograph mobilities, and, by the correspondence of calculated and found values for the elementary analyses for representative examples.

The manner of making and using our invention will now be generally described so as to enable the person skilled in the art of organic chemistry to make and use the same.

PREPARATION OF STARTING MATERIALS

The preparation of the starting materials is illustrated by the following series of reactions:

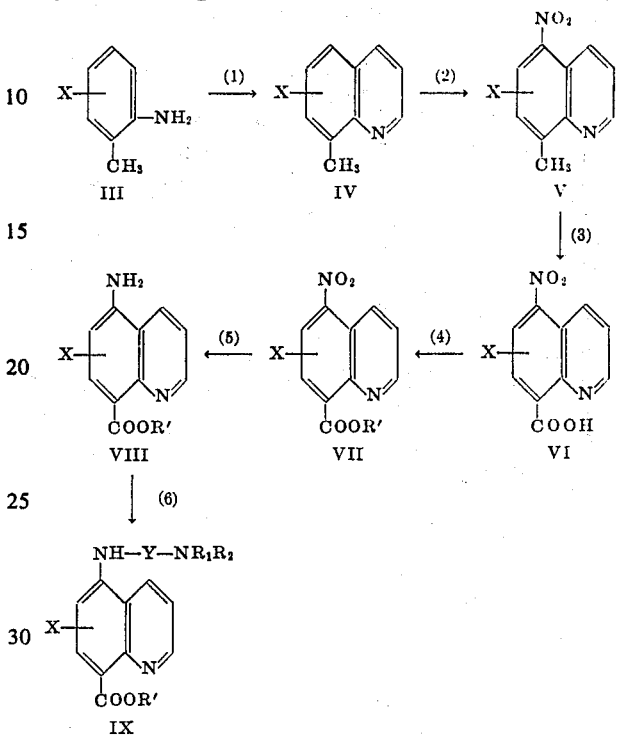

In step (1) a 4(or 3)-halo-o-toluidine (III) is subjected to the well-known Skraup synthesis, i.e., reaction with glycerol, sodium m-nitrobenzenesulfonate and sulfuric acid, to form a 6(or 7)-halo-8-methylquinoline (IV), which in step (2) is nitrated with fuming nitric acid to obtain the 6(or 7)-halo-8-methyl-5-nitroquinoline (V). Alternatively, the latter compound (V) can be prepared directly using in the Skraup synthesis a 4(or 3)-halo-5-nitro-o-toluidine or N-acetyl derivative. The latter 6(or 7)-halo-8-methyl-5-nitroquinoline (V) is treated with a suitable oxidizing agent, e.g., chromic acid, in step (3) to yield a 6(or 7)-halo-5-nitro-8-quinoline carboxylic acid (VI), which in step (4) is esterified with a lower-alkanol or suitable carboxylic acid esterifying agent, e.g., diazomethane, to form the lower-alkyl (e.g., methyl using diazomethane) 6(or 7)-halo-5-nitro-8-quinolinecarboxylate (VII). In step (5) the 5-nitroquinoline (VII) is reduced with a suitable reducing agent effective to reduce nitro to amino, e.g., iron and acetic acid or catalytic hydrogenation, to produce the lower-alkyl 5-amino-6(or 7)-halo-8-quinolinecarboxylate (VIII), which is reacted in step (6) with an aminoalkyl halide of the formula $R_1R_2N-Y-X'$ where $R_1$, $R_2$ and Y are defined as above, and X' is any halogen, preferably Cl or Br, to yield the lower-alkyl 5-aminoalkylamino-6(or 7)-halo-8-quinolinecarboxylate (IX). The compounds III, IV and V are generally known as are the processes designated as steps (1) through (5).

PREPARATION OF FINAL PRODUCTS

In carrying out the process aspect of the invention, the above intermediate lower-alkyl 6(or 7)-halo-5-($R_1$ $R_2N-Y-NH$)-8-quinolinecarboxylates (IX) are reacted with a reducing agent effective to reduce lower-alkyl carboxylates to corresponding methanols, thereby yielding the corresponding 6(or 7)-5-($R_1 R_2N-Y-NH$)-8-quinolinemethanols (Formula I where R = H). This reduction is carried out by chemical methods. Suitable chemical reducing agents include; alkali aluminum hydrides, e.g., lithium aluminum hydride; alkali borohydrides, e.g., lithium borohydride; an alkali metal and a lower-alkanol, e.g., sodium and ethanol. In practicing our invention, we preferably used lithium aluminum hydride in ether or tetrahydrofuran or lithium borohydride in a lower-alkanol, e.g., ethanol or methanol, with or without water.

The lower-alkyl ethers of our 8-quinolinemethanols, i.e., the compounds of Formula I where R is lower-alkyl, are prepared by reacting the 8-quinolinemethanol (Formula I where R is hydrogen) with the appropriate lower-alkanol in the presence of an acid, preferably a strong acid. This reaction is conveniently carried out heating the basic 6(or 7)-halo-5-($R_1R_2-Y-NH$)-8-quinolinemethanol as its acid-addition salt, e.g., di(p-toluenesulfonate), in the lower alkanol at its boiling point to dissolve the 8-quinolinemethanol salt and allowing the resulting solution to cool whereupon the basic lower-alkyl ether separates as its acid-addition salt.

The lower-alkanol esters of our 8-quinolinemethanols, i.e., the compounds of Formula I where R is lower-alkanoyl, are prepared by reacting the 8-quinolinemethanol (I where R is hydrogen) with the appropriate lower-alkanoyl halide, anhydride or other lower-alkanoylating agent, e.g., formicacetic anhydride for the formate.

The foregoing discussion is offered to illustrate the various aspects of our invention and not to limit its scope. Our invention is further illustrated by the following examples.

A. PREPARATION OF STARTING MATERIALS 1. 6-Chloro-8-methylquinoline — To 134 g. of 4-chloro-o-toluidine is added 180 g. of glycerol with vigorous stirring, followed by 280 g. of sodium 3-nitrobenzenesulfonate and 620 ml. of 65 percent (by weight) sulfuric acid. With continued stirring the reaction mixture is heated to boiling and then refluxed for three and one-half hours. The reaction mixture is made alkaline by adding 1,050 ml. of 35 percent aqueous sodium hydroxide and the alkaline mixture is steam distilled until the distillate is clear (10–12 liters collected in 3 and ½ hours). The distillate is extracted with chloroform. The extract is washed with brine and dried over anhydrous magnesium sulfate. The chloroform is removed by distilling in vacuo to leave 117 g. of colorless cloudy liquid. The liquid is distilled through a 9-inch column packed with glass helices to yield 41.6 g. of 6-chloro-8-methylquinoline as distillate which solidifies on cooling and melts at 55°–60 C.

Following the procedure described in Example A–1 but using the appropriate 4(or 3)-halo-o-toluidine in place of 4-chloro-o-toluidine, there are obtained the following 6(or 7)-halo-8-methylquinolines: 6-bromo-8-methylquinoline using 4-bromo-o-toluidine; 6-iodo-8-methylquinoline using 4-iodo-o-toluidine; 6-fluoro-8-methylquinoline using 4-fluoro-o-toluidine; 7-chloro-8-methylquinoline using 3-chloro-o-toluidine; 7-bromo-8-methylquinoline using 3-bromo-o-toluidine; and, 7-iodo-8-methylquinoline using 3-iodo-o-toluidine.

2. 6-Chloro-8-methyl-5-nitroquinoline — A 40.25 g. portion of 6-chloro-8-methylquinoline is melted and then poured in portions with swirling into 400 ml. of fuming nitric acid. The temperature rises to about 55°–60° C. The reaction mixture is allowed to stand for about 30 minutes at that temperature, next heated on a steam bath for another 30 minutes and then poured onto about 3 kg. of ice. After the ice melts, the mixture is made basic by adding 35 percent aqueous sodium hydroxide solution. The basic mixture is diluted with about 1 liter of water to dissolve all the salts and then extracted with chloroform. The chloroform solution is washed successively with water and brine, dried over anhydrous magnesium sulfate and the chloroform removed by distilling in vacuo to yield a yellow-orange solid. The solid is recrystallized from isopropyl alcohol and dried overnight in vacuo at 70° C. to yield 33.1 g. of 6-chloro-8-methyl-5-nitroquinoline, m.p. 98°–100° C. [Irving et al. JACS 72, 4069(1950), report a m.p. 99°–100 °C.]

Following the procedure described in Example A–2 but using the appropriate 6(or 7)-halo-8-methylquinoline in place of 6-chloro-8-methylquinoline, there are obtained the following 6(or 7)-halo-8-methyl-5-nitroquinolines: 6-bromo-8-methyl-5-nitroquinoline using 6-bromo-8-methylquinoline; 6-iodo-8-methyl-5-nitroquinoline using 6-iodo-8-methylquinoline; 6-fluoro-8-methyl-5-nitroquinoline using 6-fluoro-8-methylquinoline; 7-chloro-8-methyl-5-nitroquinoline using 7-chloro-8-methylquinoline; 7-bromo-8-methyl-5-nitroquinoline using 7-bromo-8-methylquinoline; 7-iodo-8-methyl-5-nitroquinoline using 7-iodo-8-methylquinoline.

3. 6-Chloro-5-nitro-8-quinolinecarboxylic Acid — A 27.2 g. portion of 6-chloro-8-methyl-5-nitroquinoline is dissolved in 100 ml. of concentrated sulfuric acid with stirring and to this solution is added 36 g. of chromium trioxide in portions over a period of 75 minutes with stirring and occasional cooling to keep the temperature at 50°–55° C. The mixture is stirred for an additional 135 minutes, during which time the temperature slowly falls to 40° C. The reaction mixture is poured onto ice and after the ice melts the mixture is extracted with ethyl acetate. The ethyl acetate extract is washed with water and then extracted with dilute aqueous potassium carbonate solution. The potassium carbonate extract is acidified with hydrochloric acid and the separated acid taken up with ethyl acetate. The ethyl acetate extract is washed successively with water and brine, dried over anhydrous magnesium sulfate and the ethyl acetate removed by distilling in vacuo to yield 12.5 g. of solid, m.p. 169°–172° C. A portion of the solid is recrystallized from benzene to yield, as a light yellow solid, the analytically pure 6-chloro-5-nitro-8-quinolinecarboxylic acid, m.p. 174.5°–176° C. NMR and IR spectra are consistent with the structure of said compound.

Following the procedure described in Example A–3 but using the appropriate 6(or 7)-halo-8-methyl-5-nitroquinoline in place of 6-chloro-8-methyl-5-nitroquinoline, there are obtained the following 6(or 7)-halo-5-nitro-8-quinolinecarboxylic acids: 6-bromo-5-nitro-8-quinolinecarboxylic acid using 6-bromo-8-methyl-5-nitroquinoline; 6-iodo-5-nitro-8-quinolinecarboxylic acid using 6-iodo-8-methyl-5-nitroquinoline; 6-fluoro-5-nitro-8-quinolinecarboxylic acid using 6-fluoro-8-methyl-5-nitro-quinoline; 7-chloro-5-nitro-8-quinolinecarboxylic acid using 7-chloro-8-methyl-5-nitroquinoline; 7-bromo-5-nitro-8-quinolinecarboxylic acid using 7-bromo-8-methyl-5-nitroquinoline; and, 7-iodo-5-nitro-8-quinolinecarboxylic acid using 7-iodo-8-methyl-5-nitroquinoline.

4. Methyl 6-chloro-5-nitro-8-quinolinecarboxylate — A 5.0 g. portion of 6-chloro-5-nitro-8-quinolinecarboxylic acid is dissolved in 300 ml. of ethyl acetate at room temperature. A solution of diazomethane is prepared by adding, with stirring (using a plastic-coated magnetic stirrer), 5 g. of nitrosomethylurea (as 7.5 g. of material wet down with 50 percent of its weight of 3 percent aqueous acetic acid) in small portions to a mixture of ether and 15 ml. of 40 percent aqueous potassium hydroxide solution. The solution of diazomethane in ether is added dropwise to the solution of said acid in ethyl acetate. The solution is stirred throughout the addition of the diazomethane for an additional hour. A little acetic acid then is added to destroy any excess diazomethane. The reaction mixture is washed successively with 10 percent aqueous potassium carbonate, water and brine. The reaction mixture is dried over anhydrous magnesium sulfate and the solvent removed by distilling in vacuo. There remains 5.25 g. of solid methyl 6-chloro-5-nitro-8-quinolinecarboxylate, m.p. 116°–121° C. The structure of the compounds is consistent with its IR spectrum.

Following the procedure described in Example A–4 but using the appropriate 6(or 7)-halo-5-nitro-8-quinolinecarboxylic acid in place of 6-chloro-5-nitro-8-quinolinecarboxylic acid, there are obtained the following methyl 6(or 7)-halo-5-nitro-8-quinolinecarboxylates: methyl 6-bromo-5-nitro-8-quinolinecarboxylate using 6-bromo-5-nitro-8-quinolinecarboxylic acid; methyl 6-iodo-5-nitro-8-quinolinecarboxylate using 6-iodo-5-nitro-8-quinolinecarboxylic acid; methyl 6-fluoro-5-nitro-8-quinolinecarboxylate using 6-fluoro-5-nitro-8-quinolinecarboxylic acid; methyl 7-chloro-5-nitro-8-quinolinecarboxylate using 7-chloro-5-nitro-8-quinolinecarboxylic acid; methyl7-bromo-5-nitro-8-quinolinecarboxylate using 7-bromo-5-nitro-8-quinolinecarboxylic acid; methyl 7-iodo-5-nitro-8-quinolinecarboxylate using 7-iodo-5-nitro-8-quinolinecarboxylic acid.

Other lower-alkyl esters are obtained by known procedures, e.g., by refluxing in ethylene dichloride a mixture of the 6(or 7)-halo-5-nitro-8-quinolinecarboxylic acid and lower-alkanol in the presence of an acidic catalyst, e.g., sulfuric acid, benzenesulfonic acid. Using 6-chloro-5-nitro-8-quinolinecarboxylic acid and methanol, ethanol or n-propanol in this procedure yields, respectively, methyl, ethyl or n-propyl 6-chloro-5-nitro-8-quinolinecarboxylate.

Alternatively and preferably, the above lower-alkyl 6(or 7)-halo-5-nitro-8-quinolinecarboxylates are obtained by reacting the appropriate acid with a lower-alkanol in the presence of boron trifluoride, as illustrated by the following preparation of methyl 6-chloro-5-nitro-8-quinolinecarboxylate: To a suspension containing 14 g. of 6-chloro-5-nitro-8-quinolinecarboxylic acid in 650 ml. of methanol was added 95 ml. of 14 percent boron trifluoride in methanol. The resulting mixture was refluxed for three hours and the methanol removed by vacuum distillation. The residue was taken up in ethyl acetate and saturated aqueous sodium bicarbonate solution; the resulting mixture was shaken well. The layers were separated and the ethyl acetate layer was dried over anhydrous magnesium sulfate. The ethyl acetate was distilled off in vacuo to yield 15 g. of methyl 6-chloro-5-nitro-8-quinolinecarboxylate, m.p. 123°–125° C. The infrared spectrum of this ester was indistinguishable from that of the same ester prepared above in the esterification procedure using diazomethane.

5. Methyl 5-amino-6-chloro-8-quinolinecarboxylate — A mixture containing 2.67 g. of methyl 6-chloro-5-nitro-8-quinolinecarboxylate, 100 ml. of glacial acetic acid and 0.20 g. of platinum oxide is hydrogenated in a Parr apparatus using an initial hydrogen pressure of 50 p.s.i. After a pressure drop of 31 p.s.i., the reduction is stopped and the catalyst filtered off. Most of the acetic acid is evaporated using a rotary evaporator. The residue is taken up in a mixture of water and ethyl acetate, and sufficient 10 percent aqueous sodium hydroxide solution is added to make the mixture basic. The ethyl acetate layer is washed successively with water and with 2N hydrochloric acid. The separated solid is removed and the layers separated. The aqueous hydrochloric acid layer is made basic with 10 percent aqueous potassium carbonate and the resulting mixture extracted with ethyl acetate. The ethyl acetate extract is washed successively with water and brine, dried over anhydrous magnesium sulfate and the solvent removed by distilling in vacuo to yield 0.83 g. of a dark brown solid. This solid is dissolved in chloroform and the chloroform solution filtered through 40 g. of silica gel in a column of 3.5 cm. diameter. The silica gel is eluted first with chloroform to remove impurities and then with ethyl acetate. The ethyl acetate eluant is evaporated to yield 0.62 g. of product, methyl 5-amino-6-chloro-8-quinolinecarboxylate.

Following the procedure described in Example A-5 but using the appropriate lower-alkyl 6(or 7)-halo-5-nitro-8-quinolinecarboxylate in place of methyl 6-chloro-5-nitro-8-quinolinecarboxylate, there are obtained the following lower-alkyl 5-amino-6(or 7)-halo-8-quinolinecarboxylates: methyl 586-bromo-6-quinolinecarboxylate using methyl 6-bromo-5-nitro-8-quinolinecarboxylate; methyl 5-amino-6-iodo-8-quinolinecarboxylate using methyl 6-iodo-5-nitro-8-quinolinecarboxylate; methyl 5-amino-6-fluoro-8-quinolinecarboxylate using methyl 6-fluoro-5-nitro-8-quinolinecarboxylate; methyl 5-amino-7-chloro-8-quinolinecarboxylate using methyl 7-chloro-5-nitro-8-quinolinecarboxylate; methyl 5-amino-7-bromo-8-quinolinecarboxylate using methyl 7-bromo-5-nitro-8-quinolinecarboxylate; methyl 5-amino-7-iodo-8-quinolinecarboxylate using methyl 7-iodo-5-nitro-8-quinolinecarboxylate; ethyl 5-amino-6-chloro-8-quinolinecarboxylate using ethyl 6-chloro-5-nitro-8-quinolinecarboxylate; n-propyl 5-amino-6-chloro-8-quinolinecarboxylate using n-propyl 6-chloro-5-nitro-8-quinolinecarboxylate.

The above lower-alkyl 5-amino 6(or 7)-halo-8-quinolinecarboxylates also are obtained by the following preferred illustrative catalystic hydrogenation of the corresponding 5-nitro compound: To a suspension containing 1.0 g. of 7 percent palladium dichloride-on-charcoal in 200 ml. of water to which 3.2 ml. of 6N hydrochloric acid had been added was added 5.0 g. of methyl 6-chloro-5-nitro-8-quinolinecarboxylate. The resulting mixture was hydrogenated using a Parr apparatus at 25° Co and an initial hydrogen pressure of 50 p.s.i. The hydrogen was taken up rapidly at first (88 percent of theory in 42 minutes) but was slow near the end (from 88–96 percent of theory required another 36 minutes). The mixture was filtered and the solid washed with water. The filtrate was made basic with 10 percent aqueous potassium carbonate solution and the resulting alkaline mixture was extracted with ethyl acetate. The extract was washed successively with water and brine, dried over anhydrous magnesium sulfate and heated in vacuo at less than 50° C. to remove the ethyl acetate and to yield 3.4 g. of solid methyl 5-amino-6-chloro-8-quinolinecarboxylate. The infrared spectrum of this product was indistinguishable from that of an analytically pure sample, m.p. 120°–130° C., prepared by reducing methyl 6-chloro-5-nitro-8-quinolinecarboxylate with iron and acetic acid, and recrystallizing the product first from benzene using decolorizing charcoal and then from ethyl acetate.

6. Methyl 6-chloro-5-(2-diethylaminoethylamino)-8-quinolinecarboxylate — A mixture containing 0.24 g. of methyl 5-amino-6-chloro-8-quinolinecarboxylate and 0.35 g. of freshly distilled 2-diethylaminoethyl chloride is heated in a sealed tube at about 180°-190° C. for about 15 minutes. The contents of the cooled tube are treated with 2.5 ml. of water and the mixture washed with ethyl acetate. The aqueous layer is made strongly basic with aqueous sodium hydroxide solution and the alkaline mixture extracted with ethyl acetate. The product is extracted from the ethyl acetate extract with 10 percent acetic acid. The acidic extract is made basic with aqueous sodium hydroxide solution and the alkaline mixture extracted with ethyl acetate. The ethyl acetate extract is washed with water, dried over anhydrous magnesium sulfate and the solvent removed by distilling in vacuo to yield the product, methyl 6-chloro-5-(2-diethylaminoethylamino)-8-quinolinecarboxylate.

Following the procedure described in Example A–6 but using the appropriate aminoalkylamino halide in place of 2-diethylaminoethyl chloride and appropriate lower-alkyl 5-amino-6-chloro-8-quinolinecarboxylate in place of methyl 5-amino-6-chloro-8-quinolinecarboxylate, there are obtained the following lower-alkyl 5-(aminoalkylamino)-6-chloro-8-quinolinecarboxylates:

methyl 6-chloro-5-(4-dimethylaminobutylamino)-8-quinolinecarboxylate using 4-dimethylaminobutyl chloride and methyl 5-amino-6-chloro-8-quinolinecarboxylate; methyl 6-chloro-5-(2-dimethylamino-1-propylamino)-8-quinolinecarboxylate using 2-dimethylamino-1-propyl chloride and methyl 5-amino-6-chloro-8-quinolinecarboxylate; methyl 6-chloro-5-(2-piperidinoethylamino)-8-quinolinecarboxylate using 2-piperidinoethyl bromide and methyl 5-amino-6-chloro-8-quinolinecarboxylate; methyl 6-chloro-5-[2-(2,5-dimethylpyrrolidino)ethylamino]-8-quinolinecarboxylate using 2-(2,5-dimethylpyrrolidino)ethyl chloride and methyl 5-amino-6-chloro-8-quinolinecarboxylate; methyl 6-chloro-5-(3-diethylaminopropylamino)-8-quinolinecarboxylate using 3-diethylaminopropyl iodide and methyl 5-amino-6-chloro-8-quinolinecarboxylate; ethyl 6-chloro-5-(2-diethylaminoethylamino)-8-quinolinecarboxylate using 2-diethylaminoethyl chloride and ethyl 5-amino-6-chloro-8-quinolinecarboxylate; n-propyl 6-chloro-5-(2-diethylaminoethylamino)-8-quinolinecarboxylate using 2-diethylaminoethyl chloride and n-propyl 5-amino-6-chloro-8-quinolinecarboxylate; methyl 6-chloro-5-[2-di-(n-butyl)aminoethylamino]-8-quinolinecarboxylate using 2-di-(n-butyl)aminoethyl chloride and methyl 5-amino-6-chloro-8-quinolinecarboxylate; methyl 6-chloro-5-(2-n-propylaminoethylamino)-8-quinolinecarboxylate using 2-n-propylaminoethyl chloride and methyl 5-amino-6-chloro-8-quinolinecarboxylate; methyl 6-chloro-5-{2-[N-ethyl-N-(2-hydroxyethyl)amino]ethylamino}-8-quinolinecarboxylate using 2-[N-ethyl-N-(2-hydroxyethyl)amino]-ethyl chloride and methyl 5-amino-6-chloro-8-quinolinecarboxylate; methyl 6-chloro-5-[2-(2-hydroxyethylamino)ethylamino]-8-quinolinecarboxylate using 2-(2-hydroxyethylamino)ethyl chloride and methyl 5-amino-6-chloro-8-quinolinecarboxylate; methyl 6-chloro-5-{2-[N,N-bis(2-hydroxyethyl)amino]ethylamino}-8-quinolinecarboxylate using 2-[N,N-bis-(2-hydroxyethyl)amino]ethyl chloride and methyl 5-amino-6-chloro-8-quinolinecarboxylate; methyl 6-chloro-5-{2-[N-methyl-N-(2-hydroxy-2-methylpropyl)amino]-ethylamino}-8-quinolinecarboxylate using 2-[N-methyl-N-(2-hydroxy-2-methylpropyl)amino]ethyl chloride and methyl 5-amino-6-chloro-8-quinolinecarboxylate; methyl 6-chloro-5-(2-piperidinoethylamino)-8-quinolinecarboxylate using 2-piperidinoethyl bromide and methyl 5-amino-6-chloro-8-quinolinecarboxylate; methyl 6-chloro-5-[2-(2-methylpiperidino)ethylamino]-8-quinolinecarboxylate using 2-(2-methylpiperidino)ethyl chloride and methyl 5-amino-6-chloro-8-quinolinecarboxylate; methyl 6-chloro-5-(2-pyrrolidinoethylamino)-8-quinolinecarboxylate using 2-pyrrolidinoethyl chloride and methyl 5-amino-6-chloro-8-quinolinecarboxylate; methyl 6-chloro-5-(2-morpholinoethylamino)-8-quinolinecarboxylate using 2-morpholinoethyl chloride and methyl 5-amino-6-chloro-8-quinolinecarboxylate; methyl 6-chloro-5-(2-hexamethyleneiminoethylamino)-8-quinolinecarboxylate using 2-(hexamethyleneimino)ethyl chloride and methyl 5-amino-6-chloro-8-quinolinecarboxylate; and, methyl 6-chloro-5-[2-(4-methylpiperazino)ethylamino]-8-quinolinecarboxylate using 2-(4-methylpiperazino)ethyl chloride and methyl 5-amino-6-chloro-8-quinolinecarboxylate.

A preferred variation in the above procedure for the preparation of said lower-alkyl 5-(aminoalkylamino)-6-chloro-8-quinolinecarboxylates is the following preparation: To a stirred mixture containing 1.37 g. of sodium hydride and 75 ml. of dimethylformamide was added dropwise a solution containing 10.4 g. of methyl 5-amino-6-chloro-8-quinolinecarboxylate in 100 ml. of dimethylformamide. There was thus obtained a solution containing the sodium salt of said 5-aminoquinoline. To said solution cooled with a 25° C. water bath was added dropwise with stirring 11.9 g. of 2-diethylaminoethyl chloride and the resulting mixture was stirred for three hours. To the reaction mixture was then added dropwise a few ml. of water and the resulting mixture was poured into about 750 ml. of water. The aqueous mixture was extracted with ethyl acetate. The aqueous mixture was washed thoroughly with water to remove the dimethylformamide and then was washed with six 25 ml. portions of a buffered solution prepared by dissolivng 67.5 g. of sodium acetate trihydrate in 500 ml. of water and adding sufficient concentrated hydrochloric acid to give a pH of 3. The six extracts were individually made basic with 10 percent aqueous potassium carbonate solution and oil fractions containing the product in free base form were obtained from each by extraction with ethyl acetate and removal of the ethyl acetate by distillation in vacuo to yield, respectively, 3.30 g., 3.50 g., 2.34 g. and 1.90 g. fractions from the first four extracts and a 0.37 g. fraction from the combined fifth and sixth extracts. The respective percentages of the desired product, i.e., methyl 6-chloro-5-(2-diethylaminoethylamino)-8-quinolinecarboxylate, in these fractions were determined by vapor phase chromatography to be 69%, 93%, 98% and 97% for fractions 1-4 and 90 percent for combined fractions 5 and 6. A portion of combined fractions 2-6 was used without further purification in the conversion to 6-chloro-5-(2-diethylaminoethylamino)-8-quinolinemethanol given hereinbelow in Example B-1.

Other lower-alkyl 5-(2-diethylaminoethylamino)-6-(or 7)-halo-8-quinolinecarboxylates prepared following the above procedure using the appropriate lower-alkyl 5-amino 6-(or 7)-halo-8-quinolinecarboxylate are the following: methyl 6-bromo-5-(2-diethylaminoethylamino)-8-quinolinecarboxylate, methyl 5-(2-diethylaminoethylamino)-6-iodo-8-quinolinecarboxylate, methyl 5-(2-diethylaminoethylamino)-6-fluoro-8-quinolinecarboxylate, methyl 7-chloro-5-(2-diethylaminoethylamino)-8-quinolinecarboxylate, methyl 7-bromo-5-(2-diethylaminoethylamino)-8-quinolinecarboxylate, methyl 5-(2-diethylaminoethylamino)-7-iodo-8-quinolinecarboxylate, ethyl 6-chloro-5-(2-diethylaminoethylamino)-8-quinolinecarboxylate, and n-propyl 6-chloro-5-(2-diethylaminoethylamino)-8-quinolinecarboxylate.

B. FINAL PRODUCTS 1. 6-Chloro-5-(2-diethylaminoethylamino)-8-quinolinemethanol — A solution containing 0.34 g. of methyl 6-chloro-5-(2-diethylaminoethylamino)-8-quinolinecarboxylate in 5 ml. of anhydrous tetrahydrofuran is added to a slurry of 40 mg. of lithium aluminum hydride in 1 ml. of tetrahydrofuran at room temperature. The reaction mixture is refluxed gently for about thirty minutes, allowed to cool, and treated with 0.1 ml. of 35 percent aqueous sodium hydroxide solution. The mixture is filtered and the solid washed with tetrahydrofuran. The tetrahydrofuran washings are combined with the tetrahydrofuran filtrate from the reaction mixture and the combined solution is washed over anhydrous magnesium sulfate. The solvent is distilled off to yield the product, 6-chloro-5-(2-diethylaminoethylamino)-8-quinolinemethanol.

Following the procedure described in Example B-1 but using the appropriate lower-alkyl 6-chloro-5-(aminoalkylamino)-8-quinolinecarboxylate in place of methyl 6-chloro-5-(2-diethylaminoethylamino)-8-quinolinecarboxylate, there are obtained the following 6-chloro-5-(aminoalkylamino)-8-quinolinemethanols: 6-chloro-5-(4-dimethylaminobutylamino)-8-quinolinemethanol using methyl 6-chloro-5-(4-dimethylaminobutylamino)-8-quinolinecarboxylate; 6-chloro-5-(2-dimethylamino1-propylamino)-8-quinolinemethanol using methyl 6-chloro-5-(2-dimethylamino-1-propylamino)-8-quinolinecarboxylate; 6-chloro-5-(2-piperidinoethylamino)-8-quinolinemethanol using methyl 6-chloro-5-(2-piperidinoethylamino)-8-quinolinecarboxylate; 6-chloro-5-[2-(2,5-dimethylpyrrolidino)ethylamino]-8-quinolinemethanol using methyl 6-chloro-5-[2-(2,5-dimethylpyrrolidino)-ethylamino]-8-quinolinecarboxylate; 6-chloro-5-(3-diethylaminopropylamino)-8-quinolinemethanol using methyl 6-chloro-5-(3-diethylaminopropylamino)-8-quinolinecarboxylate; 6-chloro-5-(2-diethylaminoethylamino)-8-quinolinemethanol using ethyl or n-propyl 6-chloro-5-(2-diethylaminoethylamino)-8-quinolinecarboxylate; 6-chloro-5-[2-di-(n-butyl)aminoethylamino]-8-quinolinemethanol using methyl 6-chloro-5-[2-di-(n-butyl)aminoethylamino]-8-quinolinecarboxylate; 6-chloro-5-(2-n-propylaminoethylamino)-8-quinolinemethanol using methyl 6-chloro-5-(2-n-propylaminoethylamino)-8-quinolinecarboxylate; 6-chloro-5-{2-[N-ethyl-N-(2-hydroxyethyl)amino]ethylamino}-8-quinolinemethanol using methyl 6-chloro-5-{2-[N-ethyl-N-(2-hydroxyethyl)-amino]ethylamino}-8-quinolinecarboxylate; 6-chloro-5-[2-(2-hydroxyethylamino)ethylamino]-8-quinolinemethanol using methyl 6-chloro-5-[2-(2-hydroxyethylamino)ethylamino]-8-quinolinecarboxylate; 6-chloro-5-{2-[N,N-bis(2-hydroxyethyl)amino]ethylamino}-8-quinolinemethanol using methyl 6-chloro-5-{2-[N,N-bis(2-hydroxyethyl)amino]ethylamino}-8-quinolinecarboxylate; 6-chloro-5-{2[N-methyl-N-(2-hydroxy-2-methypropyl)amino]ethylamino}-8-quinolinemethanol using methyl 6-chloro-5-{2-[N-methyl-N-(2-hydroxy-2-methylpropyl)amino]ethylamino}-8-quinolinecarboxylate; 6-chloro-5-(2-piperidinoethylamino)-8-quinolinemethanol using methyl 6-chloro-5-(2-piperidinoethylamino)-8-quinolinecarboxylate; 6-chloro-5-[2-(2-methylpiperidino)ethylamino]-8-quinolinemethanol using methyl 6-chloro-5-[2-(2-methylpiperidino)ethylamino]-8-quinolinecarboxylate; 6-chloro-5-(2-pyrrolidinoethylamino)-8-quinolinemethanol using methyl 6-chloro-5-(2-pyrrolidinoethylamino)-8-quinolinecarboxylate; 6-chloro-5-(2-morpholinoethylamino)-8-quinolinemethanol using methyl 6-chloro-5-(2-morpholinoethylamino)-8-quinolinecarboxylate; 6-chloro-5-(2-hexamethyleneiminoethylamino)-8-quinolinemethanol using methyl 6-chloro-5-(2-hexamethyleneiminoethylamino)-8-quinolinecarboxylate; and, 6-chloro-5-[2-(4-methylpiperazino)-ethylamino]-8-quinolinemethanol using methyl 6-chloro-5-[2-(4-methylpiperazino)ethylamino]8-quinolinecarboxylate.

The above 5-(aminoalkylamino)-6-chloro-8-quinolinemethanols also are prepared by the following preferred variation of the above reduction procedure: To a stirred suspension of 2.4 g. of lithium aluminum hydride in 40 ml. of anhydrous ether cooled to −22° C. in a bath of freezing carbon tetrachloride and solid carbon dioxide was added dropwise with stirring over a 40 minute period a solution of 6.71 g. of methyl 6-chloro-5-(2-diethylaminoethylamino)-8-quinolinecarboxylate in 80 ml. of anhydrous ether. The reaction mixture was stirred in said cooling bath for 30 hours after the addition. The reaction mixture was then hydrolyzed by cautiously adding 4.6 ml. of 10 percent aqueous sodium hydroxide solution and the mixture was filtered. The filtrate was dried over anhydrous magnesium sulfate. The solid was triturated thoroughly with boiling ethyl acetate. The ethyl acetate solution was combined with the dried filtrate and the solvents were removed in vacuo. The remaining viscous yellow oil, which weighed 6.05 g., contained at least 60 percent of the product, 6-chloro-5-(2-diethylaminoethylamino)-8-quinolinemethanol, as determined by gas-liquid partition chromatography. The product was isolated from a portion of the viscous yellow oil by preparative layer chromatography on alumina plates using 99:1 (v:v) chloroform:isopropyl amine as the eluant. A sample of 6-chloro-5-(2-diethylaminoethylamino)-8-quinolinemethanol as a viscous yellow oil, was isolated from the plates by scraping off the band with $R_f$ 0.5, washing the solid with methanol, removing the methanol in vacuo, triturating the residue with chloroform and removing the chloroform in vacuo. The elemental analyses and proton magnetic resonance spectrum of this product provided evidence for its identity. 6-Chloro-5-(2-diethylaminoethylamino)-8-quinolinemethanol as its crystalline dihydrochloride melts at 149°–152° C.

Other 5-(2-diethylaminoethylamino)-6-(or 7)-halo-8-quinolinemethanols prepared following the above procedure using the appropriate lower-alkyl 5-(2-diethylaminoethylamino)-6(or 7)-halo-8-quinolinecarboxylate are the following: 6-bromo-5-(2-diethylaminoethylamino)-8-quinolinemethanol, 5-(2-diethylaminoethylamino)-6-iodo-8-quinolinemethanol, 5-(2-diethylaminoethylamino)-6-fluoro-8-quinolinemethanol, 7-chloro-5-(2-diethylaminoethylamino)-8-quinolinemethanol, 7-bromo-5-(2-diethylaminoethylamino)-8-quinolinemethanol, and 5-(2-diethylaminoethylamino)-7-iodo-8-quinolinemethanol.

2. 6-Chloro-5-(2-diethylaminoethylamino)-8-methoxy-methylquinoline — To a solution of 0.31 g. of 6-chloro-5-(2-diethylaminoethylamino)-8-quinolinemethanol in 0.3 ml. of ethanol is added a solution of 0.38 g. of p-toluenesulfonic acid monohydrate in 1.2 ml. of ethanol. The precipitated 6-chloro-5-(2-diethylaminoethylamino)-8-quinolinemethanol di-(p-toluenesulfonate) is collected and dissolved in boiling absolute methanol. The hot methanol solution is treated with decolorizing charcoal and filtered while hot. The filtrate is allowed to cool and the resulting precipitated 6-chloro-5-(diethylaminoethylamino)-8-methoxymethylquinoline as its d-(p-toluene sulfonate) is collected. Said salt is dissolved in water, the aqueous solution made alkaline with aqueous sodium hydroxide solution, the alkaline solution extracted with methylene dichloride and the methylene dichloride removed by distilling in vacuo to yield 6-chloro-5-(2-diethylaminoethylamino)-8-methoxymethylquinoline in free base form.

Following the foregoing procedure of Example B-2 using in place of boiling methanol, boiling ethanol, 2-propanol or n-hexanol to dissolve the 6-chloro-5-(2-diethylaminoethylamino)-8-quinolinemethanol di-(p-toluenesulfonate), there are obtained the following ethers, first in the form of their di-(p-toluenesulfonates) and then in their free base forms: 6-chloro-5-(2-diethylaminoethylamino)-8-ethoxymethylquinoline; 6-chloro-5-(C2diethylaminoethylamino)-8-isopropoxymethylquinoline and 6-chloro-5-(2-diethylaminoethylamino)-8-n-hexoxymethylquinoline.

3. 8-Acetoxymethyl-6-chloro-5-(2-diethylaminoethylamino)-quinoline — To a solution containing 1 g. of 6-chloro-5-(2-diethylaminoethylamino)-8-quinolinemethanol in 0.9 ml. of pyridine is added 0.8 ml. of acetic anhydride and the mixture heated gently in a bath of warm water. After about 30 minutes, the reaction mixture is poured into water and the precipitated product, 8-acetoxymethyl-6-chloro-5-(2-diethylaminoethylamino)-quinoline, is collected.

Other lower-alkanoyl esters of 6-chloro-5-(2-diethylaminoethylamino)-8-quinolinemethanol are obtained following the above procedure of Example B-3 using the appropriate alkanoylating agent, e.g., the 8-propionoxymethyl compound using propionic anhydride, the 8-n-butyroxymethyl compound using butyric anhydride and the 8-formyloxymethyl compound using formic acetic anhydride.

The 6(or 7)-halo-5-($R_1R_2$N—Y—NH)-8-quinolinemethanols, their lower-alkyl ethers and their lower-alkanoyl esters of our invention when administered orally to hamsters and Swiss mice infected with *Schistosoma mansoni* were found to clear the animals of the parasitic infection at dose levels of compound in the range of 0.5 to 100 mg. per kg. of body weight per day for 5 consecutive days.

The actual determination of the numerical schistosomacidal data definitive for a particular compound is readily obtained by standard test procedures, referred to above, by technicians versed in chemotherapeutic test procedures, without any need for any extensive experimentation.

The 5-(aminoalkylamino)-6(or 7)-halo-8-quinolinemethanols, lower-alkyl ethers and lower-alkanol esters of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

The subject matter which the applicants regard as their invention is particularly pointed out and distinctly claimed as follows:

1. A composition of matter selected from the group consisting of: a compound of the formula

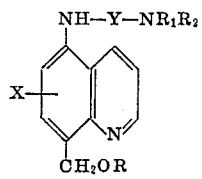

where X is halo, R is hydrogen, lower-alkyl or lower-alkanoyl, Y is lower-alkylene having from two to four carbon atoms and having its two connecting linkages on different carbon atoms, $R_1$ is hydrogen, lower-alkyl or lower-2-hydroxyalkyl having from two to six carbon atoms and having the hydroxy group attached to the carbon atom that is one carbon atom removed from the side chain nitrogen atom, $R_2$ is lower-alkyl or lower-2-hydroxyalkyl as defined for $R_1$, or, $R_1$ and $R_2$ taken with N comprehend a saturated N-heteromonocyclic group having from 5 to 7 ring atoms selected from piperidino, pyrrolidino, hexamethyleneimino or such groups having from one to three hydrogens attached to available ring-atoms replaced by lower-alkyl groups, lower-alkyl in each instance being primary or secondary and having from one to six carbon atoms and lower-alkanoyl having from one to six carbon atoms; and, chemotherapeutically acceptable salts thereof.

2. 5-[2-(di-lower-alkyl)aminoethylamino]-6-halo-8-quinolinemethanol according to claim 1 where halo is attached to the 6-position, Y is $CH_2CH_2$, and $R_1$ and $R_2$ are each lower-alkyl.

3. 5-(2-diethylaminoethylamino)-6-chloro-8-quinolinemethanol according to claim 2 where halo is chloro, and $R_1$ and $R_2$ are each ethyl.

4. Lower-alkyl ether of 5-(2-diethylaminoethylamino)-6-chloro-8-quinolinemethanol according to claim 1 where Y is $CH_2CH_2$, halo is 6-chloro, and $R_1$ and $R_2$ are each ethyl.

5. Lower-alkanoyl ester of 5-(2-diethylaminoethylamino)-6-chloro-8-quinolinemethanol according to claim 1 where Y is $CH_2CH_2$, halo is 6-chloro, and $R_1$ and $R_2$ are each ethyl.

* * * * *